United States Patent Office 3,530,175
Patented Sept. 22, 1970

3,530,175
PROCESS FOR PREPARING α,β-UNSATURATED CARBOXYLIC ACIDS
Masaya Yanagita, 162 Kamihoya, Hoya-cho, Kitatama-gun, Tokyo, Japan; Masao Kitahara, 938 Sakusabe-cho, Chiba-shi, Chiba-ken, Japan; Kaoru Tsuboyama, 335 Maruyamajutaku, 31 Maruyama - cho, Bunkyo - ku, Tokyo, Japan; and Takashi Mitsui, 1 Nakameguro, Meguro-ku, Tokyo, Japan
No Drawing. Filed Sept. 27, 1965, Ser. No. 490,623
Claims priority, application Japan, Sept. 30, 1964, 39/55,216
Int. Cl. C07c 51/26
U.S. Cl. 260—530   12 Claims

ABSTRACT OF THE DISCLOSURE

A high yield process for preparing α,β-unsaturated carboxylic acids by the vapor phase oxidation of the correponding α,β-unsaturated aldehydes with molecular oxygen using a highly active catalyst composition consisting of oxygenated compounds of molybdenum, vanadium and aluminum compounded in ratios by weight of 100:1–500: 0.1–20 calculated as $MoO_3$, $V_2O_5$ and $Al_2O_3$, respectively.

---

This invention relates to a process for preparing α,β-unsaturated carboxylic acids from the corresponding α,β-unsaturated aldehydes by oxidizing latter in vapor phase. It is an object of this invention to prepare α,β-unsaturated carboxylic acids with economical advantages and ease.

The reaction carried out for the preparation of the said acids is shown below by the following general reaction formula:

wherein $R_1$ and $R_2$ are hydrogen, methyl or ethyl group. For example, acrylic acid can be prepared from acrolein and methacrylic acid from methacrolein in accordance with the above reaction formula.

It is extremely difficult to produce α,β-unsaturated carboxylic acids by means of selective oxidation of only the aldehyde groups contained in α,β-unsaturated aldehydes, since undesirable reactions such as polymerization, etc. are liable to occur, accompanying the said selective oxidation, owing to a double bond adjacent to the aldehyde group. Though many workers have attempted to carry out such oxidation and also many propositions of method of the oxidation of the aldehyde to the acid have been presented, yet there has been no successful method established as an industrially economical one.

Main methods among those proposed include the methods of vapor-phase oxidation by air or oxygen in the presence of metal oxide catalyst (U.S. Pats. Nos. 2,881,-212–4, No. 3,021,366, No. 3,087,964, and U.K. Pat. No. 878,802–3, No. 903,034), oxidation in an organic solvent by atmospheric or pressurized air or oxygen in the presence of metallic salts of organic acids, vanadic acid and so forth as catalysts (U.S. Pats. No. 2,341,399, No. 2,397,891, J. Org. Chem., 26 (1961) 565–9), oxidation in tertiary-butanol solvent by hydrogen peroxide in the presence of selenium dioxide (U.S. Pat. Nos. 2,744,928–9, J. Org. Chem., 22 (1957) 746–8), and oxidation in alkaline aqueous solution by oxygen in the presence of metallic silver (U.S. Pats. No. 2,930,801, No. 2,887,496). Although the $H_2O_2$—$SeO_2$ oxidation method is the most interesting of all described above and can give approximately stoichiometric amount of α,β-unsaturated carboxylic acid as a product, it is difficult to immediately employ the method as an established industrial one since there is a difficulty in using $H_2O_2$ of high concentration as an oxidizer in the method.

The method using the metal silver described above which can be expected to give a satisfactory yield has disadvantages of that the α,β-unsaturated carboxylic acid produced is in the form of an alkali salt and the lifetime of the catalyst used is not long enough.

Although the other two methods are those wherein air or oxygen is used as an oxidizer and, therefore, are of very great interest as the most economical oxidation method, it is very often impossible to reproduce such good yields as shown in the literature when the method is put into practice by the applicant.

Among the literatures relating to a vapor-phase oxidation method, there is U.K. Pat. No. 903,034 wherein examples of oxidation by the employment of a Mo—V catalyst system are described in the specification. According to the examples, the catalyst system shows, as its performance, the followiog results: reactivity, 59.5%; yield of acrylic acid, 28.5%; selectivity to the acrylic acid, 47.8%; each of which will hereafter be defined. Thus, the said catalyst cannot be employed as one for industrial use as long as its performance remains as it is.

It has now been found by the applicant that such a difficult oxidation as that of α,β-unsaturated aldehydes can be carried out with great ease and higher yield using a method whereby the aldehydes is oxidized in a vapor-phase in the presence of a novel catalyst of the invention. That is, according to the present invention, the α,β-unsaturated aldehyde can be oxidized in a vapor phase to α,β-unsaturated carboxylic acid with ease and also stoichiometric yield by use of both mixed complex compound catalyst consisting of oxides of molybdenum, vanadium, and aluminum which has been activated by a special pre-treatment and molecular oxygen in the presence of steam and other inert gases. The present invention provides an advantageous method for oxidizing α,β-unsaturated aldehydes which had been considered to be difficult to establish as an economical method.

The possibility of obtaining the α,β-unsaturated carboxylic acids efficiently from the α,β-unsaturated aldehydes by the said vapor-phase oxidation suggests that the α,β-unsaturated carboxylic acid can similarly be obtained directly from olefinic hydrocarbons such as propylene, isobutylene and so forth, through a single process consisting of two steps by use of two kinds of catalysts.

The said single process can make it possible to separate the α,β-unsaturated carboxylic acid immediately from the mixture of gaseous products by such easy operations as cooling, washing with water, etc., perfectly eliminating a troublesome step of collecting the α,β-unsaturated aldehydes which are intermediate products in this process, in order to give α,β-unsaturated carboxylic acids at a commercially extremely low cost.

The reaction in the single process can be illustrated by the following reaction formula:

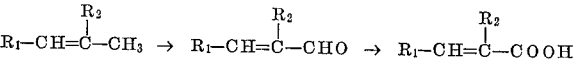

wherein $R_1$ and $R_2$ are hydrogen, $CH_3$ or $C_2H_5$ group.

Now, the present invention shall hereafter be explained in detail, referring to preparation of acrylic acid by oxidation of acrolein.

Catalysts used in this oxidation of acrolein were a number of types of 6–10 meshed spongy aluminum whereon oxide of molybdenum (represented by $MoO_3$), oxide of vanadium (represented by $V_2O_5$), and oxide of aluminum (represented by $Al_2O_3$) were deposited in such various ratios (by weight) among the three oxides as shown in Table I. After acrolein has been oxidized under fixed conditions of feeding as follows: 50 ml. of each of the said catalysts, 5.0 g./h. of acrolein, 100 ml./min.

of nitrogen, 250 ml./min. of air, 500 ml./min. of steam, 3.7 vol. percent concentration of acrolein, and 1,040 h.$^{-1}$ of space velocity, the yields of acrylic acid obtained from the acrolein are shown for comparison in Table I.

TABLE I

| Type of catalyst $MoO_3:V_2O_5:Al_2O_3$ | Reaction temperature, °C. | Reactivity, mol percent | Yield of acrylic acid, mol percent | Selectivity, mol percent |
|---|---|---|---|---|
| 100:0:1 | 360 | 14.5 | 2.8 | 19.3 |
| 100:1:1 | 350 | 63.4 | 39.3 | 62.0 |
| 100:5:1 | 320 | 98.4 | 74.5 | 75.7 |
| 100:12.5:1.1 | 300 | 95.2 | 85.5 | 89.8 |
| 100:20:1.2 | 300 | 97.3 | 85.7 | 88.1 |
| 100:50:1.5 | 300 | 98.9 | 80.7 | 81.6 |
| 100:100:2 | 300 | 98.1 | 74.8 | 76.2 |
| 100:200:3 | 280 | 96.7 | 68.3 | 70.6 |
| 100:300:4 | 260 | 94.5 | 51.7 | 54.7 |
| 100:500:6 | 240 | 92.2 | 37.4 | 40.6 |
| 100:20:0.1 | 300 | 81.1 | 57.4 | 70.8 |
| 100:20:0.3 | 300 | 89.5 | 66.6 | 74.4 |
| 100:20:5 | 300 | 87.7 | 64.1 | 73.1 |
| 100:20:20 | 300 | 80.4 | 31.7 | 39.6 |

The data in Table I show that the catalysts bearing not only $MoO_3$ and $Al_2O_3$ but also $V_2O_5$ have a very highly catalytic activity to form acrylic acid while the other catalyst containing only $MoO_3$ and $Al_2O_3$ has hardly any catalytic activity under the said reaction conditions. $V_2O_5$ can be used in a wide range of its amounts on the basis of that of $MoO_3$. However, as the amount of $V_2O_5$ used is increasing beyond three times that of $MoO_3$, the normal oxidation tends to be accompanied with harder overoxidation. In this case acrylic acid is gradually decreasing in its yield, since the acrylic acid once formed is increasingly decomposed oxidatively owing to such said overoxidation. On the other hand, when an amount of $V_2O_5$ contained in a catalyst is less than 1% on the basis of $MoO_3$, the catalyst somewhat decreases in its catalytic activity. Thus, it is advisable that amounts of $V_2O_5$ present in a catalyst should be in the range from 1 to 500%, most preferably 5–300%, by weight on the basis of that of $MoO_3$ in order to obtain good results.

Then, amounts of $Al_2O_3$ present in a catalyst should preferably be between 0.1 to 20% by weight on the basis of that of $MoO_3$ therein and the best results were obtained when the $Al_2O_3$ was used in amounts of 0.3 to 5% on the same basis.

Acrylic acid is formed in somewhat less amount when a catalyst of which $Al_2O_3$ content is over 20% on the said basis is used.

In this invention, it has now been found from the above results that catalysts wherein metal oxides consist of $V_2O_5$, $Al_2O_3$ and $MoO_3$ compounded in ratios of 1–500:0.1–20:100 should be used.

Catalysts to be employed in this invention are those which have a proper activity as a catalyst for oxidizing $\alpha,\beta$-unsaturated aldehydes to $\alpha,\beta$-unsaturated carboxylic acids, do not decrease in their activity as a catalyst during their use, have a sufficient lifetime, are very easy and simple to prepare, and additionally are prepared at a lower cost.

Ammonium molybdate $((NH_4)_6Mo_7O_{24} \cdot 4H_2O)$ or water-soluble molybdates are used as raw materials of oxides of molybdenum and ammonium metavanadate $(NH_4VO_3)$ or water-soluble vanadates as raw materials of oxide of vanadium. In this case, water-insoluble compounds such as $MoO_3$, $V_2O_5$, and the like can also be employed as starting material.

As raw materials of oxide of aluminum, aluminum hydroxide $(Al(OH)_3)$, aluminum nitrate $$(Al(NO_3)_3 \cdot 3H_2O)$$

aluminum oxide $(Al_2O_3)$, metal aluminum, and the like are used.

It is very advantageous in the practice of the present invention that a minor portion of spongy aluminum dissolved in the solution should make itself a constituent of a catalyst during the preparation of the catalyst. The amount of aluminum dissolved in this case varies depending upon the amounts of metal oxides, water, and ammonia water present in the solution and is generally between 1–5% on the basis of that of $MoO_3$. Additional compounds of aluminum are added to the solution when $Al_2O_3$-rich catalyst is required and when any substance other than spongy aluminum is used as a carrier of the catalyst.

To the catalyst of this invention one or more of various metal oxides can be added, such as the oxides of Cu, Ag, Au, Ca, Sr, Ba, Mg, Zn, Cd, B, Ti, Zr, Si, Ge, Sn, P, As, Sb, Bi, Cr, W, U, Se, Te, Mn, Fe, Co, Ni, and the like. In this case the amount that may be added is generally below 10% on the basis of that of $MoO_3$.

Spongy aluminum is employed as a carrier of the catalyst. Pumice, fire stone, silica gel, alumina, silicon carbide, spongy iron, coal cinders, fired clay, acid clay, carborundum, fire brick, and the like can also be used as a carrier. It, however, was when spongy aluminum was employed as a carrier that the best results were obtained. The reason why the spongy aluminum gives the best results would be that the sponge (its apparent specific weight somewhat varying, depending upon a size of particles and being generally 0.927 when the particle size is of 6–10 meshes) has an extremely small surface (0.2–1.0 m.²/g., in general) and can remove heat of reaction evolved away therefrom owing to its good thermal conductivity.

It is advisable that the particle size of a carrier should be of 4–20 meshes (preferably, of 4–10 meshes) for a fixed bed oxidation process and should be of 50–150 meshes for a fluid bed process. That is to say, the size should be determined depending on what oxidation process is to be employed and there has been no essential difference in properties as a carrier due to the difference only is particle size.

It is recommendable that the amount of a catalyst portion to be deposited on a carrier portion should be between 5–70% by weight of the carrier, but not advisable for the purpose of this invention that the catalyst should be employed alone without the carrier.

Tests were carried out, using in each of them a different one of catalysts of which catalyst portions are same and of which carrier portions different each other as shown in Table II, under such fixed conditions of feeding as follows: 50 ml. of catalyst wherein its catalyst portion consists of $MoO_3$, $V_2O_5$ and $Al_2O_3$ in ratios of 100:20:1.2, 5.0 g./h. of acrolein, 100 ml./min. of nitrogen, 250 ml./min. of air, and 500 ml./min. of steam.

The results obtained by the tests are shown in Table II for comparison of how the said results have been affected by the difference in substance used as a carrier.

TABLE II

| Carrier | Reaction temperature, °C. | Reactivity, mol percent | Yield of acrylic acid, mol percent | Selectivity, mol percent |
|---|---|---|---|---|
| Spongy aluminum | 300 | 97.3 | 85.7 | 88.1 |
| Silica gel | 330 | 81.1 | 58.6 | 72.3 |
| Electrofused alumina | 390 | 72.8 | 37.0 | 50.8 |
| Fired clay | 385 | 81.4 | 52.4 | 64.4 |
| Pumice | 355 | 57.0 | 36.5 | 64.1 |
| Coal cinders | 380 | 80.9 | 49.1 | 60.7 |
| No carrier | 290 | 64.1 | 16.6 | 25.9 |

The air fortified with oxygen, the air diluted with nitrogen, carbonic acid gas, steam and so on, or oxygen and the like can also be used as an oxidizing agent for the vapor-phase catalytic oxidation of this invention, though the air alone is normally employed for the same purpose as the above.

In this case, both saturated and unsaturated aliphatic hydrocarbons containing from 3 to 4 carbon atoms can also be used as a diluent. The best results, in each of the tests, were obtained when the amount of oxygen used was in ratios of 0.5–20, more preferably 0.5–10, molecules per molecule of $\alpha,\beta$-unsaturated aldehyde, the raw material.

It is undesirable to use an excess of oxygen beyond the highest ratio above since such excessive oxygen causes the products, $\alpha,\beta$-unsaturated carboxylic acid to lower in its purity by accelerating the product to decompose and oxidize. It is very important to add steam to the reaction system in order to accomplish the reaction satisfactorily selectively and smoothly. The addition of steam makes it easier to determine the most suitable length of contact time and also helps remove heat of reaction. It is advisable to add steam in ratios of 1–50, more preferably 5–30, molecules per molecule of raw material, the $\alpha,\beta$-unsaturated aldehyde. It is not always desirable to add too much of steam, since a concentration of acrylic acid in the resulting aqueous acid solution from the recovery of the acid in a vapor form by cooling with ice and/or by washing with water will decrease, whereas the selectivity in the reaction will improve when too much steam is used.

The concentration of $\alpha,\beta$-unsaturated aldehyde in the mixed gas, that is, the feed can vary in a wide range and is recognized to be between 1–10% as a suitable range.

It is advisable to keep reaction temperatures in the range of 200–500° C., more desirably 250–380° C., though they may vary depending upon molar ratios of oxygen, concentrations of $\alpha,\beta$-unsaturated aldehyde present in the mixed gas, and the like.

The acceleration of decomposition, oxidation, and polymerization of the formed $\alpha,\beta$-unsaturated carboxylic acid undesirably results in less yield of the product, the acid, when a reaction temperature is too much higher.

The outline of a method for preparing a catalyst to be used in the practice of this invention is shown below.

To some amount of spongy aluminum particles of a proper size placed in an evaporating dish is added a warm solution of ammonium molybdate and ammonium metavanadate in water wherein a very smaller amount of 28% ammonia water and, if necessary, a bit of aluminum hydroxide have been incorporated. The solution is evaporated, under agitation in a water-bath, to dryness to deposit catalyst components on the spongy aluminum. The resulting solid, that is, the unfinished catalyst-on-carrier is further dried enough, charged into a reaction tower (steel; inner dia., 1.65 cm.; height, 115 cm.; heat transmission by niter; heating by two pieces at 1 kw. Nichrome wire), heated gradually up to 250–400° C. passing the air through the tower, and then kept at this temperature still in the air stream for 5–20 hours. This last step of keeping the solid at temperatures of 250–400° C., preferably 250–350° C., in the air stream for 1–20 hours, preferably 3–10 hours, is designated as "the first pre-treatment" for convenience's sake. The firstly pre-treated solid is discharged from the tower and sieved to give a catalyst-on-carrier in particles of a desired size. (The term "catalyst" herein shall hereafter be referred to as "catalyst-on-carrier" for clarification even if the former term still used, since the said catalyst means a catalyst-on-carrier which consists of both a catalyst portion and a carrier portion.) In this pre-treatment, temperatures used are critical. The catalyst subjected to an excess of thermal treatment in this pretreatment decreases in its activity and comes to be of no use as a catalyst for the preparation of $\alpha,\beta$-unsaturated carboxylic acids.

To show effects of temperatures in the first pretreatment on yields of acrylic acid, tests were carried out under fixed conditions, allowing only temperatures to change, as follows: 50 ml. of the catalyst of which catalyst portion consists of $MoO_3$, $V_2O_5$, and $Al_2O_3$ in ratios of 100:20:1.2 (the amount of the catalyst portion deposited on the spongy aluminum as a carrier is 20% of the aluminum), 5.0 g./h. of acrolein, 100 ml./min. of nitrogen, 250 ml./min. of air, and 500 ml./min. of steam.

The results in the tests are shown in Table III for comparison.

TABLE III

| Conditions of pre-treatment | | Reaction temperature, ° C. | Reactivity, mol percent | Yield of acrylic acid, mol percent | Selectivity, mol percent |
|---|---|---|---|---|---|
| The first pre-treatment with air | The 2nd pre-treatment with feed | | | | |
| 300° C., 20 hrs | 400° C., 3 hrs | 300 | 97.3 | 85.7 | 88.1 |
| 400° C., 20 hrs | do | 300 | 87.7 | 59.0 | 67.2 |
| 500° C., 20 hrs | do | 340 | 46.0 | 15.9 | 34.7 |

The catalyst formed by the first pre-treatment is again charged in the desired amount into the reaction tower and treated at temperatures of 350–450° C. for 1–10 hours, preferably 3–5 hours, while passing gaseous feed consisting of various gases mentioned above through the reaction tower, which is designated as "the second pre-treatment."

Thus, there is obtained catalysts having suitable activity as those for the preparation of acrylic acid. It is understood that the first pre-treatment may be successively followed by the second one. If catalysts are treated at temperatures as low as 250–350° C. in the second pre-treatment stage, the treated catalysts will decrease yields of acrylic acid because of their less activation.

In the oxidation of $\alpha,\beta$-unsaturated aldehydes using the catalyst previously obtained, the catalyst commences its catalytic action on gaseous feed immediately the catalyst still in position after the second pre-treatment is cooled to the desired temperature by passing gaseous feed through the reaction tower. There are many methods for preparing and for charging gaseous feed that could easily be inferred by those skilled in the art.

One of the methods is shown below as an example.

A small amount of gaseous nitrogen is introduced into a vaporizer (kept at a constant temperature of 20° C.) for $\alpha,\beta$-unsaturated aldehydes and then both the gaseous nitrogen and the aldehyde vapor are introduced into the reaction tower through its top after they have been mixed with the air or oxygen. On the other hand, water is sent in desired amounts to the vaporizer installed on the top of the reaction tower by an output-adjustable pump, instantaneously vaporized, introduced into the tower at its top, and then passed through the bed of catalyst after having been intermixed with the mixed $\alpha,\beta$-unsaturated aldehyde-nitrogen-air gas. The product gas formed by oxidation during the passage of the gaseous feed through the bed is ice-cooled or washed with water. Thus, the formed $\alpha,\beta$-unsaturated carboxylic acids can be easily and completely collected by absorbing them in water.

Analyses for the reaction product were obtained in the following manners.

The yield of $\alpha,\beta$-unsaturated carboxylic acids was determined by chromatography (the apparatus of GC1A type made by the Shimazu Seisakusho, Japan; behenic acid-di-2-ethylhexyl sebacate 0.75 m. column, helium 100 ml./min., temp. 130° C., the internal standard substance being methacrylic acid in the case of oxidation of acrolein). The amount of the aldehydes remaining unchanged which were recovered together with the formed acids by cooling with ice or by washing with water so that the aldehydes might be retained in the resulting solution was determined by gas-chromatography (the apparatus of GC1B type made by the Shimazu Seisakusho, Japan; polyethyleneglycol 1000–1.5 m. column, helium 50 ml./min., temp. 80° C., the internal standard substance being normal propanol) and, on the other hand, the amount of the aldehydes suffering no oxidation in the exhausted gas was found by measuring the weight of 24-dinitrophenylhydrazone formed as a precipitate from the saturated solution of 2,4-dinitrophenylhydrazine in 2 N HCl.

The terms "reactivity, yield, and selectivity" used herein are defined below, respectively:

$$\text{reactivity (percent)} = \frac{\text{weight of C in }\alpha,\beta\text{-unsaturated aldehydes supplied} - \text{Weight of C in }\alpha,\beta\text{-unsaturated aldehydes left unchanged}}{\text{weight of C in }\alpha,\beta\text{-unsaturated aldehydes supplied}} \times 100$$

$$\text{yield (percent)} = \frac{\text{weight of C in }\alpha,\beta\text{-unsaturated carboxylic acids produced}}{\text{weight of C in }\alpha,\beta\text{-unsaturated aldehydes supplied}} \times 100$$

$$\text{selectivity (percent)} = \frac{\text{weight of C in }\alpha,\beta\text{-unsaturated carboxylic acids produced}}{\text{weight of C in }\alpha,\beta\text{-unsaturated aldehydes consumed}} \times 100$$

EXAMPLE 1

Into an evaporating dish in which 92.7 g. (100 ml.) of spongy aluminum of 6–10 meshes are placed is added at one time a solution of 20.37 g. of ammonium molybdate and 4.28 g. of ammonium metavanadate in 200 ml. of warm water, 2 ml. of 28% ammonia water having been added in the said solution; and then the resulting mixture is, under agitation, evaporated to dryness in a water-bath to deposit the residue on the spongy aluminum. The thus-obtained solid is dried enough, charged into a reaction tower, and then firstly pre-treated with 1 liter/min. of the air introduced into the tower at its top. The solid is gradually heated up to 300° C. at which the introduction of the air into the tower is stopped, allowed to cool, discharged from the tower, and then sieved with a sieve of 10 meshes. Thus, the first pre-treatment is accomplished.

50 ml. of the said sieved particles now the unfinished catalyst, are again charged into the tower and then the second pre-treatment of the unfinished catalyst is commenced by passing gaseous feed (consisting of 5.0 g./h. of acrolein, 100 ml./min. of nitrogen, 250 ml./min. of the air, and 500 ml./min. of steam) through a bed made up of the said catalyst after the inner temperature of the tower has reached 350° C. The inner temperature of the tower is gradually raised to 400° C. and thereafter kept at this temperature for three hours to subject the catalyst to the second pre-treatment.

The resulting finished catalyst contains, as its catalyst portion, 20 g. in total of metal oxides which consist mainly of $MoO_3$, $V_2O_5$, and $Al_2O_3$ mixed in the ratio by weight of 100:20:1.2.

Samples are taken for their analyses while lowering the reaction temperature after the second pre-treatment has been accomplished. The effects of the reaction temperatures on the yields of acrylic acid are shown in Table IV below.

TABLE IV

| | Reactivity, mol percent | Yield of acrylic acid, mol percent | Selectivity, mol percent |
|---|---|---|---|
| Reaction temperature, ° C.: | | | |
| 380 | 99.1 | 55.6 | 56.1 |
| 340 | 99.1 | 71.8 | 72.5 |
| 300 | 97.3 | 85.7 | 88.1 |
| 260 | 78.9 | 61.0 | 77.3 |

EXAMPLE 2

Gaseous feed (molar ratio of oxygen to acrolein is 9.0) consisting of 5.0 g./h. of acrolein, 100 ml./min. of nitrogen, 100 ml./min. of oxygen, 250 ml./min. of the air, and 500 ml./min. of steam was introduced into the reaction tower at its top and passed through a layer made up of 50 ml. of the catalyst as in Example 1. The reactivity, yield of acrylic acid, and selectivity as the results obtained at the reaction temperature of 280° C. were 99.7 mol percent, 66.2 mol percent, and 66.4 mol percent, respectively.

Another test was carried out using the same catalyst and gaseous feed (molar ratio of oxygen to acrolein being 1.2) comprising 5.0 g./h. of acrolein, 100 ml./min. of the air, 250 ml./min. of nitrogen, and 500 ml./min. of steam. In this test, the reactivity, yield of acrylic acid, and selectivity were 84.6 mol percent, 82.9 mol percent, and 98.0 mol percent, respectively when the reaction was performed at the temperature of 320° C.

EXAMPLE 3

Gaseous feed made up of 5.0 g./h. of acrolein, 100 ml./min. of nitrogen, 250 ml./min. of the air, and 1 liter/min. of steam (the molar ratio of steam to acrolein in the said feed being 30.0) was introduced at the top of the reaction tower and passed through a layer made up of 50 ml. of catalyst as in Example 1. The reactivity, yield of acrylic acid, and selectivity as the results obtained at the reaction temperature of 320° C. were 99.2, 91.2, and 91.9 mol percent, respectively.

A test was made using the same catalyst and gaseous feed consisting of 5.0 g./h. of acrolein, 250 ml./min. of the air, 100 ml./min. of nitrogen, and 170 ml./min. of steam (the molar ratio of the steam to the acrolein in the feed being 5.0). In the test, the reactivity, yield of acrylic acid, and selectivity at the reaction temperature of 300° C. were 94.7, 82.5, 87.1 mol percent, respectively.

Another test was further carried out at the reaction temperature of 300° C. using the same feed as described above except that no steam was contained in the feed and, in this case, the yield of acrylic acid was decreased to 33.7 mol percent.

EXAMPLE 4

In the manner as in Example 1, a catalyst of which catalyst portion consisted of $MoO_3$, $V_2O_5$, and $Al_2O_3$ in the ratio by weight of 100:50:1.5 was prepared using 92.7 g. (100 ml.) of spongy aluminum of 6–10 meshes, 16.30 g. of ammonium molybdate, 8.57 g. of ammonium metavanadate, 2 ml. of 28% ammonia water, and 200 ml. of water.

50 ml. of the prepared catalyst (unfinished) was pre-treated in the reaction tower as in Example 1 and then used in a test. The test was made at the reaction temperature of 320° C. for 28 hours, using gaseous feed composed of 4.66 g./h. of acrolein, 100 ml./min. of nitrogen, 250 ml./min. of the air, and 500 ml./min. of steam.

A condensed aqueous solution of acrylic acid which were obtained from a total of 130.5 g. of acrolein used by cooling with ice the product gas after the reaction, was 838 ml. In this solution were contained 137.9 g. of acrylic acid, 5.8 g. of acetic acid, and 0.3 g. of formic acid. The yield of the acrylic acid was 82.2 mol percent, while the amount of acrolein left unchanged was only 1.3 g. (1.0 mol percent).

EXAMPLE 5

A catalyst of which catalyst portion was composed of $MoO_3$, $V_2O_5$, and $Al_2O_3$ in the ratio of 100:5:1 was prepared in the manner as in Example 1, using 92.7 g. (100 ml.) of spongy aluminum of 6–10 meshes, 23.27 g. of ammonium molybdate, 1.22 g. of ammonium metavanadate, 2 ml. of 28% ammonia water, and 200 ml. of water. 50 ml. of this catalyst were charged into the reaction tower, pre-treated therein as in Example 1 except that methacrolein was used instead of acrolein, and then used in a test. The test was made at the reaction temperature of 320° C., using 8.3 g./h. of methacrolein, 330 ml./min. of the air, and 1 liter/min. of steam, in addition to the said catalyst. The results obtained were as follows: reactivity of methacrolein, 87.5 mol percent; yield of methacrylic acid, 67.7 mol percent; selectivity, 77.4 mol percent.

EXAMPLE 6

A catalyst of which catalyst portion consisted of $MoO_3$, $V_2O_5$, and $Al_2O_3$ mixed in the ratio of 100:12.5:1.1 was prepared in the similar manner as in Example 1, using 92.7 g. (100 ml.) of 6–10 meshed spongy aluminum, 21.74 g. of ammonium molybdate, 2.86 g. of ammonium metavanadate, 2 ml. of 28% ammonia water, and 200 ml. of water. 50 ml. of the resulting catalyst were charged into the reaction tower, pre-treated therein in such a manner as in Example 1, and then used, in situ, in the oxidation of acrolein. In this oxidation, 7.5 g./h. of acrolein, 150 ml./min. of nitrogen, 375 ml./min. of the air, and 500 ml./min. of steam were all introduced into the reaction tower at its top and passed through the layer comprising the said catalyst. The reactivity and yield of acrylic acid obtained at the reaction temperature of 310° C. were 96.8 and 84.6 mol percent, respectively.

EXAMPLE 7

50 ml. of the catalyst of the same kind as in Example 4 were charged into the reaction tower to be pre-treated as in Example 1 and thereafter used in oxidizing acrolein in the presence of propylene.

Gaseous feed used in this case was composed of 5.0 g./h. of acrolein, 100 ml./min. of propylene, 250 ml./min. of the air, and 500 ml./min. of steam. The reactivity, yield of acrylic acid, and selectivity obtained at the reaction temperature of 310° C. were 74.4 mol percent, 61.4 mol percent and 82.5 mol percent, respectively.

As for the propylene, only 0.37% of it was consumed by its passage through the layer of the catalyst.

EXAMPLE 8

A catalyst which catalyst portion was composed of $MoO_3$, $V_2O_5$ and $Al_2O_3$ deposited on a carrier in the ratio of 100:20:5 was prepared, using as raw materials 92.7 g. (100 ml.) of 6–10 meshed spongy aluminum, 19.75 g. of ammonium molybdate, 4.15 g. of ammonium metavanadate, 0.91 g. of aluminum hydroxide, 5 ml. of 28% ammonia water, and 200 ml. of water. 50 ml. of the resulting catalyst were charged into the reaction tower, therein pre-heated in the manner as in Example 1 and then used, in situ, in a test. The reaction at the reaction temperature of 300° C. carried out using as feed 5.0 g./h. of acrolein, 100 ml./min. of nitrogen, 250 ml./min. of the air, and 500 ml./min. of steam gave such results as follows: reactivity of acrolein, 87.7 mol percent; yield of acrylic acid, 64.1 mol percent; selectivity, 73.1 mol percent.

EXAMPLE 9

A catalyst of which catalyst portion consisted of $MoO_3$, $V_2O_5$, and $Al_2O_3$ deposited on a carrier in the ratio of 100:200:3 was prepared, using 92.7 g. (100 ml.) of spongy aluminum of 6–10 meshes as the carrier, 8.15 g. of ammonium molybdate, 17.14 g. of ammonium metavanadate, 2 ml. of 28% ammonia water, and 200 ml. of water.

50 ml. of the thus-obtained catalyst were charged into the reaction tower, pre-treated as in Example 1, and then employed, in situ, in the reaction.

The reaction which was carried out at the reaction temperature of 300° C. using as gaseous feed 10.8 g./h. of acrolein, 200 ml./min. of nitrogen, 500 ml./min. of the air, and 1,000 ml./min. of steam, gave such results as follows: reactivity, 79.4 mol percent; yield of acrylic acid, 54.9 mol percent; selectivity, 69.1 mol percent.

What we claim is:

1. A process for producing an $\alpha\beta$-unsaturated carboxylic acid, which is characterized by oxidizing in the vapor phase, a feedstock comprising the corresponding $\alpha,\beta$-unsaturated aldehyde with molecular oxygen in the presence of a catalyst-on-carrier of which the catalyst portion consists of a mixed complex compound of molybdenum, vanadium and aluminum oxides compounded in the ratio by weight of 100:1–500:0.1–20 calculated as $MoO_3$, $V_2O_5$ and $Al_2O_3$, respectively, wherein the catalyst is prepared from an aqueous solution of the salts of catalyst metals to deposit the metallic salts on a carrier and then treated by a first treatment with air at temperatures of 250–400° C. followed by a second treatment with said feedstock at temperatures of 350–450° C., said feedstock consisting of $\alpha,\beta$-unsaturated aldehydes, oxygen and gases inert to the process.

2. The process as claimed in claim 1 wherein the $\alpha,\beta$-unsaturated carboxylic acid is acrylic acid and the corresponding $\alpha,\beta$-unsaturated aldehyde is acrolein.

3. The process as claimed in claim 1 wherein the $\alpha,\beta$-unsaturated carboxylic acid is methacrylic acid and the corresponding $\alpha,\beta$-unsaturated aldehyde is methacrolein.

4. The process as claimed in claim 1 wherein the oxidation is carried out in the presence of at least one inert gas selected from the group consisting of $C_3$–$C_4$ saturated and unsaturated aliphatic hydrocarbons.

5. The process as claimed in claim 4 wherein the $C_3$–$C_4$ saturated and unsaturated aliphatic hydrocarbon is at least one hydrocarbon selected from the group consisting of propylene and isobutylene.

6. The process as claimed in claim 1 wherein the vapor-phase oxidation is carried out at temperatures of 200–500° C. by use of a gaseous feed having $\alpha,\beta$-unsaturated aldehydes in concentrations of 1–10 vol. percent of the feed, and molar ratios of 0.5–20 of oxygen to aldehydes and molar ratios of 1–50 of steam to aldehydes in the feed.

7. The process as claimed in claim 1 wherein said molecular oxygen is provided by air or oxygen.

8. The process according to claim 1, wherein the catalyst is pretreated before use in the vapor phase oxidation by a first pre-treatment with air at temperaures of 250–400° C. for about 1–20 hours followed by a second pre-treatment with gaseous feed to the process at temperatures of 350–450° C. for about 1–10 hours.

9. The process as claimed in claim 1, wherein the vapor phase oxidation is carried out in the presence of steam as a diluent.

10. The process according to claim 1, wherein the carrier is spongy aluminum.

11. A process according to claim 1, wherein the catalyst portion and the carrier are present in the ratio by weight of 5–70:100.

12. The process according to claim 1, wherein the aqueous solution is deposited on said carrier and is then evaporated to dryness to deposit said metallic salts on said carrier.

References Cited

UNITED STATES PATENTS 2,462,938  3/1949  Bludworth et al. ---- 260—530
3,358,020  12/1967  Hendrickx.
3,408,392  10/1968  Yamagishi.

FOREIGN PATENTS 1,387,693  1/1965  France.
903,034  8/1962  Great Britain.

LORRAINE A. WEINBERGER, Primary Examiner

D. E. STENZEL, Assistant Examiner